Patented Sept. 5, 1950

2,520,908

UNITED STATES PATENT OFFICE 2,520,908

METHYL ESTERS OF SUBTILIN

John F. Carson and James C. Lewis, Berkeley, Calif., assignors to the United States of America as represented by the Secretary of Agriculture No Drawing. Application June 7, 1949, Serial No. 97,713

5 Claims. (Cl. 167—65)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to methyl esters of subtilin, particularly those which contain at least 9 methoxyl equivalelnts per $10^4$ grams, and has among its objects the provision of such esters and processes for their preparation. Other objects will be apparent from the description of the invention.

Subtilin is an antibiotic produced by a particular strain of *Bacillus subtilis* and has antibiotic activity against a number of pathogenic organisms including *Bacillus anthracis, Diplococcus pneumoniae, Neisseria gonorrheae, Mycobacterium tuberculosis,* and *Endamoeba hystolytica.*

The preparation of subtilin under sumberged conditions is disclosed in the patent application of Joseph F. Stubbs et al., Serial No. 776,397, filed September 26, 1947. The isolation of subtilin from surface or submerged cultures is disclosed in the following United States patents: K. P. Dimick et al., Pat. No. 2,459,139 granted January 18, 1949; K. P. Dimick et al., Pat. No. 2,476,085 granted July 12, 1949; and H. Lineweaver et al., Pat. No. 2,481,763 granted September 13, 1949.

Subtilin has a low solubility in water in the presence of inorganic salts. This factor has greatly retarded its use since it cannot be effectively applied by parenteral administration—it being soluble only to the extent of about 0.1% in blood.

In the patent application of James C. Lewis and Eugene F. Jansen, Serial No. 6,104, filed February 3, 1948 now Patent 2,495,743, there are disclosed and claimed the methyl esters of subtilin. These derivatives possess enhanced biological activity and increased solubility on the order of twice that of subtilin itself. It has now been found that if the methoxyl content of the methyl esters of subtilin is increased by a small proportion, the solubility of the ester increases to a disproportionately large degree, namely, from about 25 to 50 times that of subtilin itself. The products of this invention, which possess such a high solubility, are thus capable of being advantageously utilized in parenteral administration.

According to the instant invention, the methyl esters of subtilin are prepared by esterification of subtilin under mild conditions such that extensive esterification takes place whereas degradative reactions are avoided. To this end, subtilin is reacted with methanol in the presence of an acid. A convenient method of procedure is to dissolve the subtilin in the acidified methanol and then allow the ingredients of the mixture to react until the esterification to the desired degree takes place, that is, until a methyl ester of subtilin containing at least 9, and preferably from at least 9 to about 13, methoxyl equivalents per $10^4$ grams is produced. The ester is then isolated by removing the acid anions and evaporating the water and excess methanol. The product may also be isolated by other techniques, as will be explained hereinafter.

The process of this application is preferably applied to subtilin in purified form such as is obtained by the processes of the K. P. Dimick et al. or H. Lineweaver et al. patents referred to above. However, it is also possible to utilize the methyl esters of subtilin as produced by the process of the Lewis and Jansen patent application, also referred to above, and further esterify them to the desired methoxyl content.

The proportion of subtilin to methanol may vary within wide limits. Generally, the methanol is used both as a reagent and as a solvent, and for this reason it is employed in large excess. It is generally advisable to utilize as concentrated a solution of subtilin as possible to react the greatest possible quantity of subtilin in any given time.

The solubility of subtilin in methanol is enhanced by the presence of water, and it is thus sometimes advisable to use aqueous methanol to allow reaction of larger amounts of subtilin. The methanol may contain from zero percent (anhydrous) to about 10% water. In general, however, the less water present the more complete will be the esterification.

The concentration of acid should be from about 0.01 N to about 0.6 N. In general, the higher concentrations of acid will cause more rapid esterification. Although hydrochloric acid is preferred, other mineral acids such as sulphuric, phosphoric, hydrobromic, etc. may be used. Regardless of what acid is employed, the concentration should be substantially within the range specified above.

After dissolving the subtilin in the acidified methanol, the acidified solution is allowed to stand so that esterification can take place. Usually, room temperature (25° C.) is used as it is the most convenient. However, in general, temperatures from about 0° C. to about 50° C. are suitable.

The time of reaction is, of course, dependent on several factors such as concentration of subtilin, concentration of methanol with respect to water, concentration of acid, and temperature. Generally, the reaction is allowed to continue until a product of the desired solubility is formed. This point can be determined by conducting solubility tests at stated intervals on a pilot reaction mixture.

After the reaction has yielded a product of desired solubility, the product may be isolated in several ways. One convenient method involves contacting the solution with an anion-exchange material, for example, an organic resin anion-exchange material, to remove the acid anions (chloride ions in the case where hydrochloric acid is used as the acid). The de-anionized solution is then dried to obtain the solid product. Another method of isolation involves neutralizing the acidic reaction mixture with a basic substance such as sodium hydroxide, ammonium hydroxide, potassium hydroxide, sodium carbonate, sodium bicarbonate, potassium carbonate, potassium bicarbonate, carbonates of ammonia, and so forth, and then subjecting the solution to evaporation. A further method of isolation involves adding an organic solvent to the acid reaction mixture to precipitate the methyl ester. As the organic solvents, ether, acetone, or other solvents which are miscible with methanol may be used.

In the following examples, which are illustrative of the invention, bio-assays were carried out with the subtilin and with the novel products against *Micrococcus conglomeratus*, employing the technique described by J. C. Lewis and others in Archives of Biochemistry, vol. 14, pp. 437–450. The activity of the products is reported on a relative basis, giving subtilin an arbitrary activity of 1. Thus an activity of 1.5 means that a given weight of the product has 1.5 times the activity of the same weight of the subtilin used as the starting material.

Solubility of the products was determined in 0.85 percent aqueous sodium chloride solution at a pH of 7.3 to 7.4 and temperature 35° C. (approximate physiological condition of blood). Under these conditions subtilin had a solubility of 0.096%.

EXAMPLE I

One gram of subtilin (isolated according to the Lineweaver et al. application mentioned previously) was dissolved in 100 ml. of absolute reagent-grade methanol containing HCl in a concentration of 0.03 N. The reaction mixture was allowed to stand at 25° C. for 92 hours. At the end of this time the solution was stirred with an organic resin anion exchange material to absorb the anions present in the liquid, particularly the chloride ions. The de-anionized solution was then subjected to a vacuum at room temperature until all the methanol had been evaporated leaving the subtilin methyl ester as a solid, gummy material. In order to convert the ester into a powder form, it was dissolved in water. This aqueous solution was then frozen and then subjected to a vacuum while in the frozen state until free from water. The dry, yellowish-white powder was obtained in approximately quantitative yield (98%) and had a methoxyl content of 9.5 methoxyl equivalents per $10^4$ grams. The activity of this product was 1.5 times that of the subtilin used as the starting material. Its solubility was 2.95%, i. e., 31 times as soluble as subtilin.

EXAMPLE II

The experiment set forth in Example I was repeated, the only exception being that the reaction was allowed to continue for 98 hours. The product had a methoxyl content of 11.0 methoxyl equivalents per $10^4$ grams and its activity 1.2 times that of the subtilin used as the starting material. The product had a solubility of 4.43 percent, i. e., 46 times as soluble as subtilin.

The following experiments do not illustrate the products or processes of this invention and are included only to demonstate the marked difference in solubility caused by small difference in methoxyl content.

Control Experiment A

The experiment set forth in Example I was repeated, the only exception being that the reaction was allowed to continue for 29 hours. The product had a methoxyl content of 7.8 equivalents per $10^4$ grams, and its solubility was 0.24%, i. e., 2.5 times that of subtilin.

Control Experiment B

The experiment set forth in Example I was repeated, the only exception being that the reaction was allowed to continue for 44 hours. The product had a methoxyl content of 8.6 equivalents per $10^4$ grams, and its solubility was 0.39 percent, i. e., 4.1 times that of subtilin.

The solubility data from the foregoing examples and the controls are summarized in the following table:

| | Time, hours | Methoxyl content, methoxyl equivalents per $10^4$ grams | Solubility, per cent (in 0.85% aqueous NaCl at pH 7.3 to 7.4 at 35° C.) | Relative solubility of ester to subtilin, itself |
|---|---|---|---|---|
| Subtilin | | | 0.096 | 1.00 |
| Control Expt. A | 29 | 7.8 | 0.24 | 2.5 |
| Control Expt. B | 44 | 8.6 | 0.39 | 4.1 |
| Example I | 92 | 9.5 | 2.95 | 31.0 |
| Example II | 98 | 11.0 | 4.43 | 46.0 |

The methyl esters of subtilin prepared in accordance with this invention contain at least 9 methoxyl equivalents per $10^4$ grams and preferably from at least 9 to about 13 methoxyl equivalents per $10^4$ grams. These esters possess activities against *Micrococcus conglomeratus*, *Staphylococcus aureus*, and *Streptococcus faecalis* in the same order as subtilin itself and in many cases have a higher order of activity. Their solubility in aqueous solutions containing inorganic salts is much greater than subtilin being on the order of 25 to 50 times more soluble than subtilin itself. The products are white to yellowish-white solid materials. The solubility of the esters is generally proportional to the degree of esterification. However, as solubility increases the activity falls off somewhat so that it is generally inadvisable to esterify to a degree more than 13 methoxyl equivalents per $10^4$ grams.

We claim:
1. A process comprising forming a solution of subtilin in methanol containing from zero (anhydrous) to about 10% water and containing a mineral acid in a concentration of about from 0.01 N to .6 N, and allowing the subtilin and methanol to react at a temperature of about from

0° C. to 50° C. until a methyl ester of subtilin containing at least 9 methoxyl equivalents per $10^4$ grams is produced.

2. A process comprising forming a solution of subtilin in methanol containing from zero (anhydrous) to about 10% water and containing a mineral acid in a concentration of about from 0.01 N to .6 N, and allowing the subtilin and the methanol to react at a temperature of about from 0° C. to 50° C. until a methyl ester of subtilin containing from at least 9 to about 13 methoxyl equivalents per $10^4$ grams is produced.

3. A process comprising forming a solution of subtilin in methanol containing from zero (anhydrous) to about 10% water and containing a mineral acid in a concentration of about from 0.01 N to .6 N, allowing the subtilin and the methanol to react at a temperature of about from 0° C. to 50° C. until a methyl ester of subtilin containing from at least 9 to about 13 methoxyl equivalents per $10^4$ grams is produced, and recovering the formed ester.

4. A methyl ester of subtilin containing at least 9 methoxyl equivalents per $10^4$ grams.

5. A methyl ester of subtilin containing from at least 9 to about 13 methoxyl equivalents per $10^4$ grams.

JOHN F. CARSON.
JAMES C. LEWIS.

No references cited.